US011108651B1

(12) United States Patent
Mermoud et al.

(10) Patent No.: US 11,108,651 B1
(45) Date of Patent: Aug. 31, 2021

(54) ADAPTIVE OSCILLATION CONTROL FOR NETWORK PATHS USING MACHINE LEARNING

(71) Applicant: Cisco Technology, Inc., San Jose, CA (US)

(72) Inventors: Grégory Mermoud, Venthône (CH); Jean-Philippe Vasseur, Saint Martin d'uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/082,215

(22) Filed: Oct. 28, 2020

(51) Int. Cl.
  *H04L 12/24* (2006.01)
  *H04L 12/707* (2013.01)
(52) U.S. Cl.
  CPC .......... *H04L 41/5019* (2013.01); *H04L 45/22* (2013.01)
(58) Field of Classification Search
  None
  See application file for complete search history.

(56) References Cited

U.S. PATENT DOCUMENTS

| 9,843,486 | B2 | 12/2017 | Feller et al. |
| 9,853,882 | B2 | 12/2017 | Vasseur et al. |
| 10,103,970 | B2 | 10/2018 | Dasgupta et al. |
| 10,289,973 | B2 | 5/2019 | Feller et al. |
| 2020/0084152 | A1 | 3/2020 | Zhang et al. |

OTHER PUBLICATIONS

Varadhan, Kannan et al. "Persistent route oscillations in inter-domain routing." Computer Networks. vol. 32, Issue 1. Elsevier Science. Jan. 2000. pp. 1-16. (Year: 2000).*
Elliott, Vivian et al. "Characterizing and reducing route oscillations in the Internet." Computer Communications. vol. 26, Issue 2. Elsevier Science. Feb. 2003. pp. 143-153 (Year: 2003).*
Ji, M. "Dial-controlled hash: reducing path oscillation in multipath networks." 12th International Conference on Computer Communications and Networks. IEEE. 2003. pp. 184-191 (Year: 2003).*
U.S. Appl. No. 16/856,399, Apr. 23, 2020, Vasseur et al.,

* cited by examiner

*Primary Examiner* — Jeffrey R Swearingen
(74) *Attorney, Agent, or Firm* — Behmke Innovation Group LLC; Kenneth J. Heywood; Jonathon P. Western

(57) ABSTRACT

In one embodiment, a device generates a model of oscillations between a particular path in a network satisfying a service level agreement template of traffic conveyed via the particular path and the particular path in the network not satisfying the service level agreement template. The device causes the traffic to be rerouted onto the particular path, based on a prediction by the model that the particular path will not oscillate for a period of time. The device determines, using the model, an adjustment to the service level agreement template that would reduce the oscillations. The device provides, to a user interface, an indication of the adjustment to the service level agreement template.

20 Claims, 12 Drawing Sheets

ADAPTIVE OSCILLATION CONTROL FOR NETWORK PATHS USING MACHINE LEARNING

TECHNICAL FIELD

The present disclosure relates generally to computer networks, and, more particularly, to adaptive oscillation control for network paths using machine learning.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection in an SD-WAN now becomes possible through the use of machine learning techniques. This provides for the opportunity to implement proactive routing whereby traffic in the network is rerouted before an SLA violation occurs. However, in certain situations, a particular path may oscillate between violating the SLA and not violating the SLA.

DESCRIPTION OF EXAMPLE EMBODIMENTS

Overview

Figure 1A:
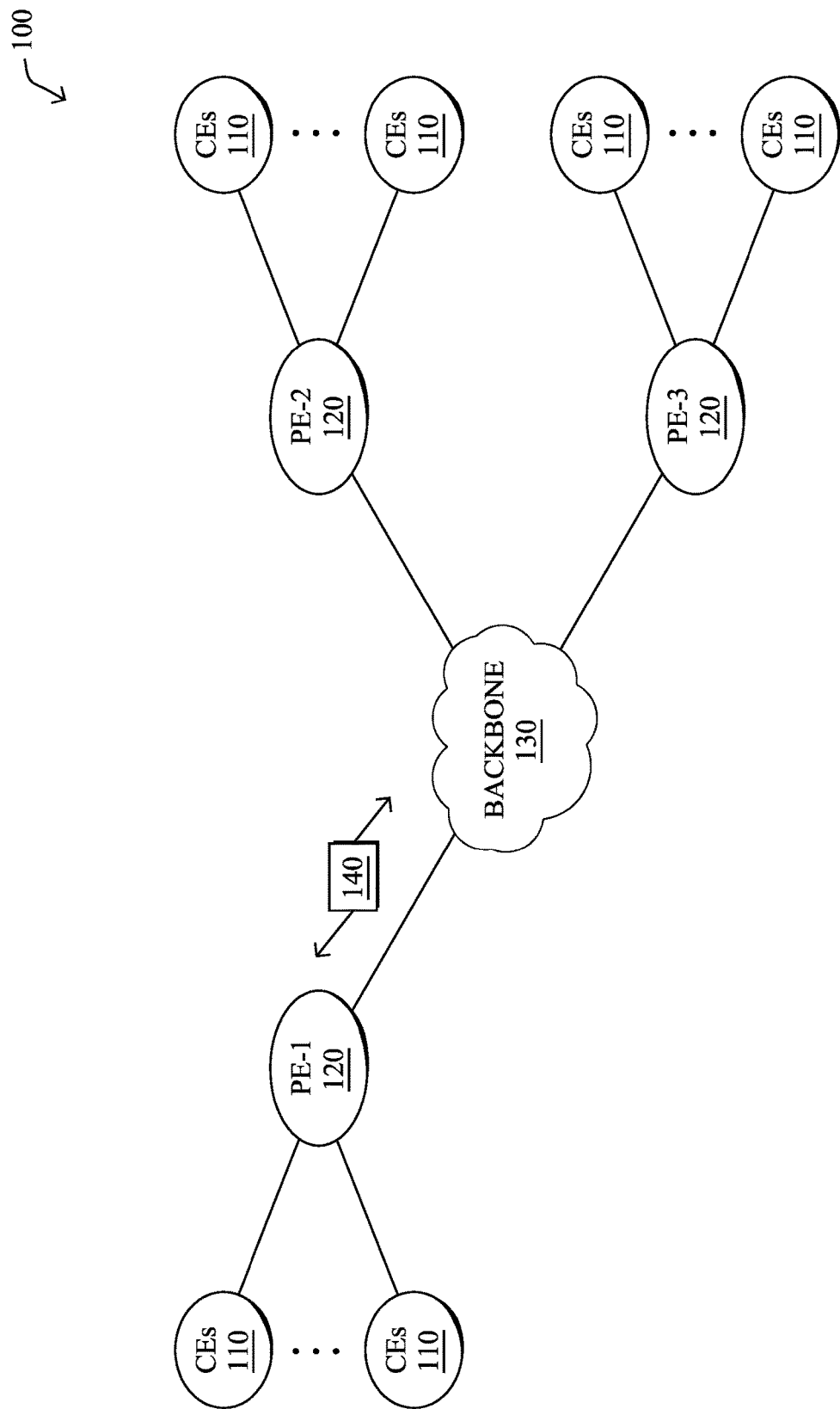
FIGS. 1A-1B illustrate an example communication network.

According to one or more embodiments of the disclosure, a device generates a model of oscillations between a particular path in a network satisfying a service level agreement template of traffic conveyed via the particular path and the particular path in the network not satisfying the service level agreement template. The device causes the traffic to be rerouted onto the particular path, based on a prediction by the model that the particular path will not oscillate for a period of time. The device determines, using the model, an adjustment to the service level agreement template that would reduce the oscillations. The device provides, to a user interface, an indication of the adjustment to the service level agreement template.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
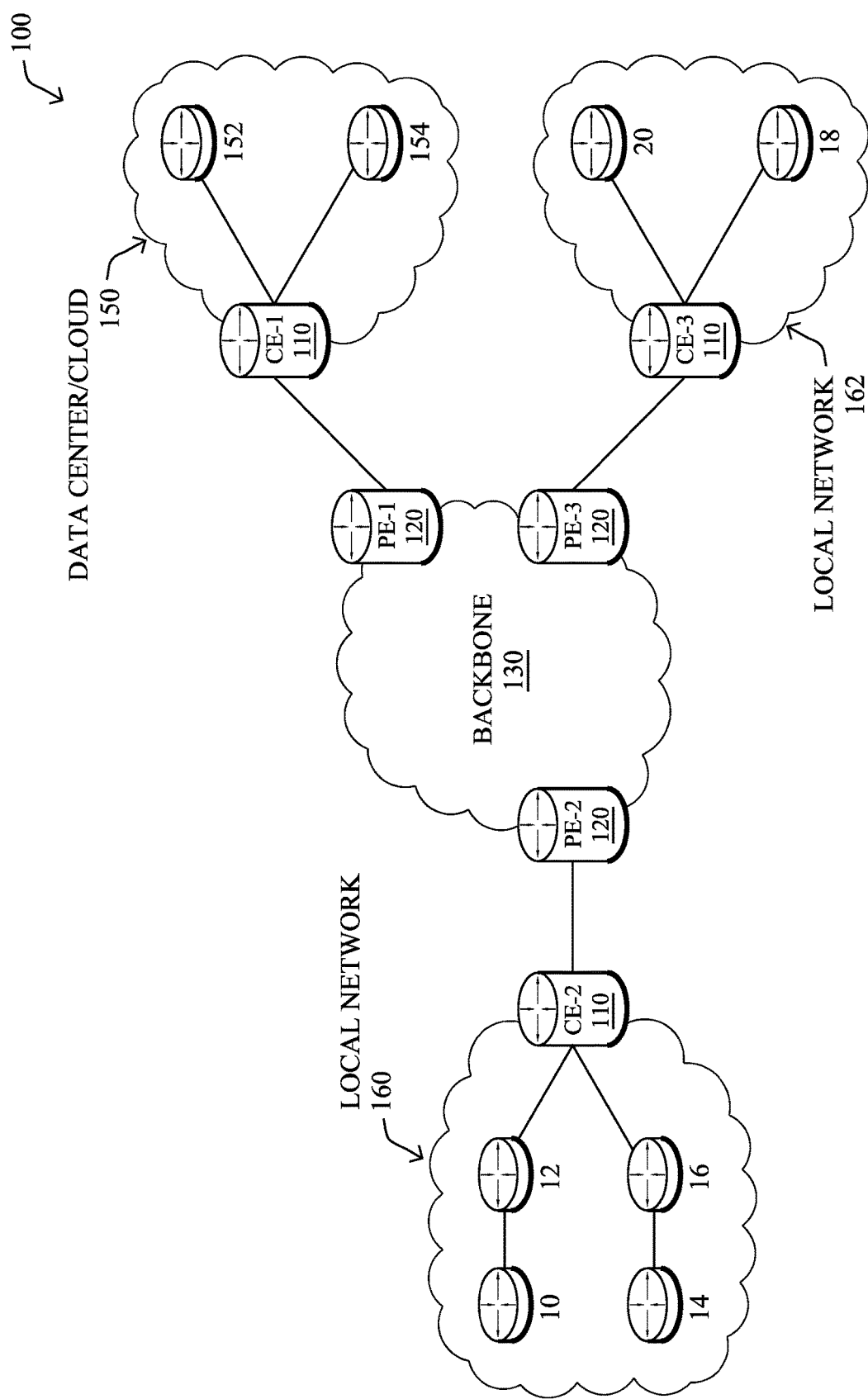

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
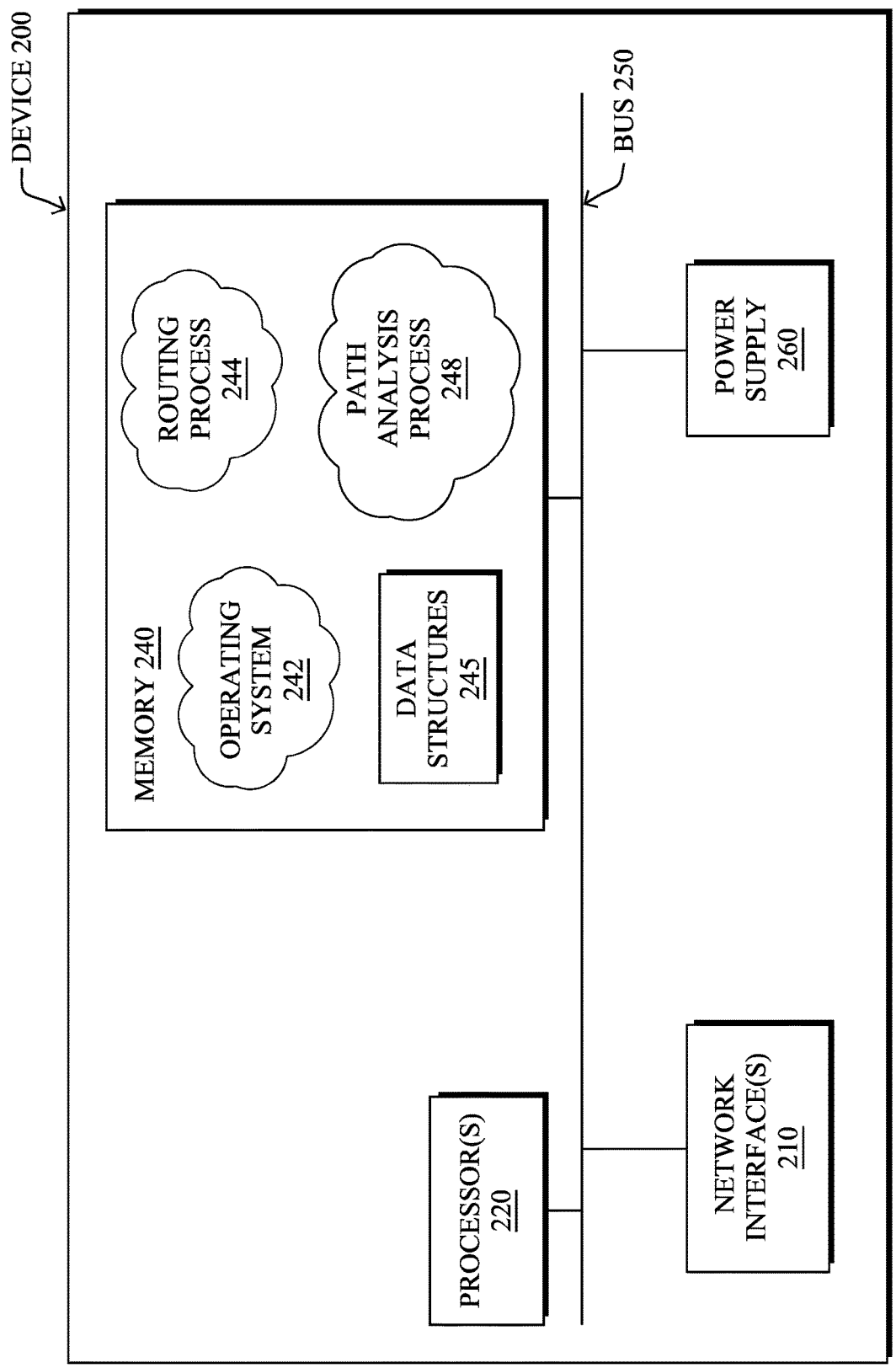
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a path evaluation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or path evaluation process 248 may also include computer executable instructions that, when executed by processor(s) 220, cause device 200 to perform the techniques described herein. To do so, in some embodiments, routing process 244 and/or path evaluation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or path evaluation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or path evaluation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that conditions in the network will result in an SLA associated with traffic for a particular application will be violated. Conversely, the false negatives of the model may refer to the number of times the model incorrectly predicted that the SLA will not be violated. True negatives and positives may refer to the number of times the model correctly predicted whether the SLA will not be violated or will be violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
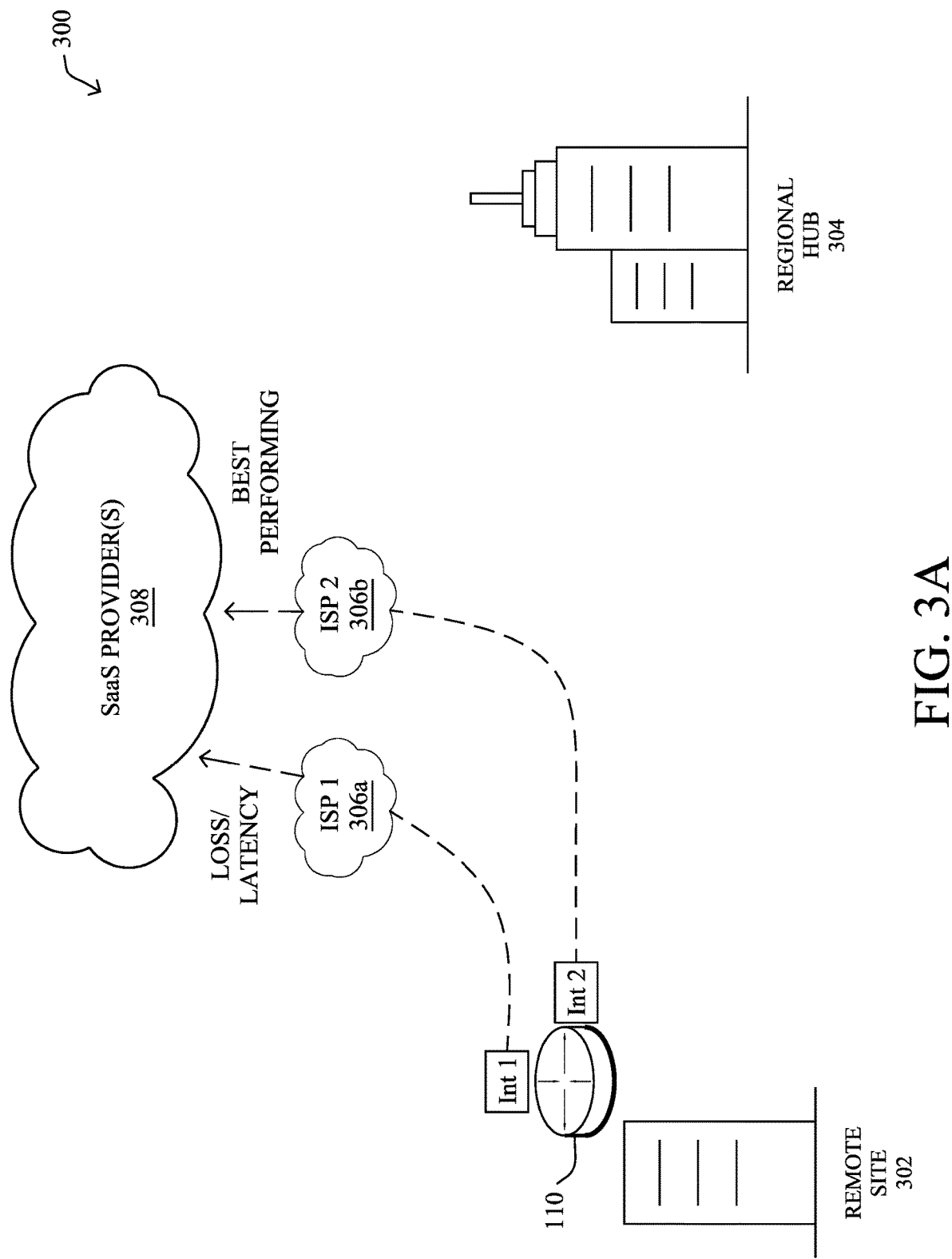
FIGS. 3A-3B illustrate example network deployments.
Figure 3B:
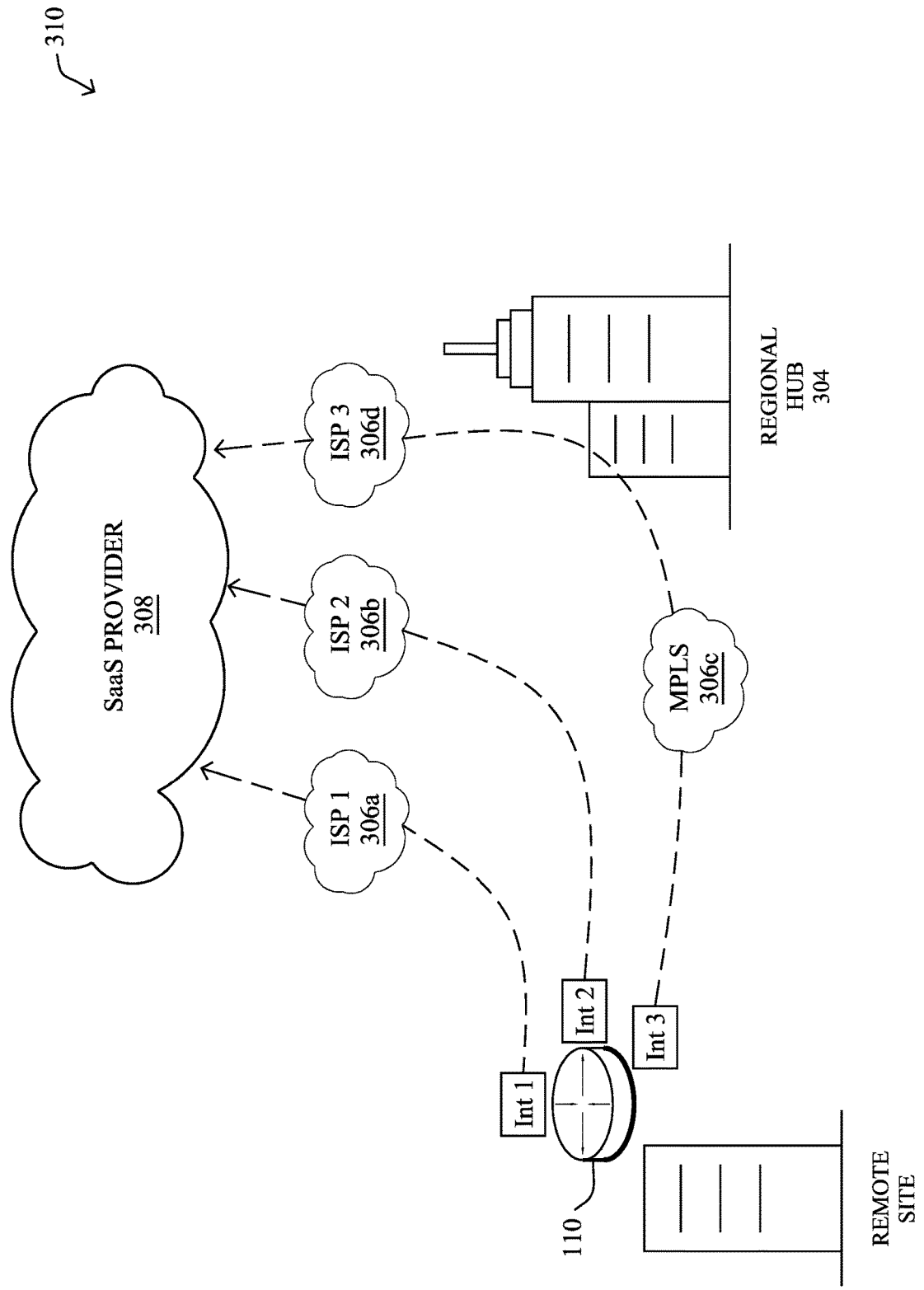

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
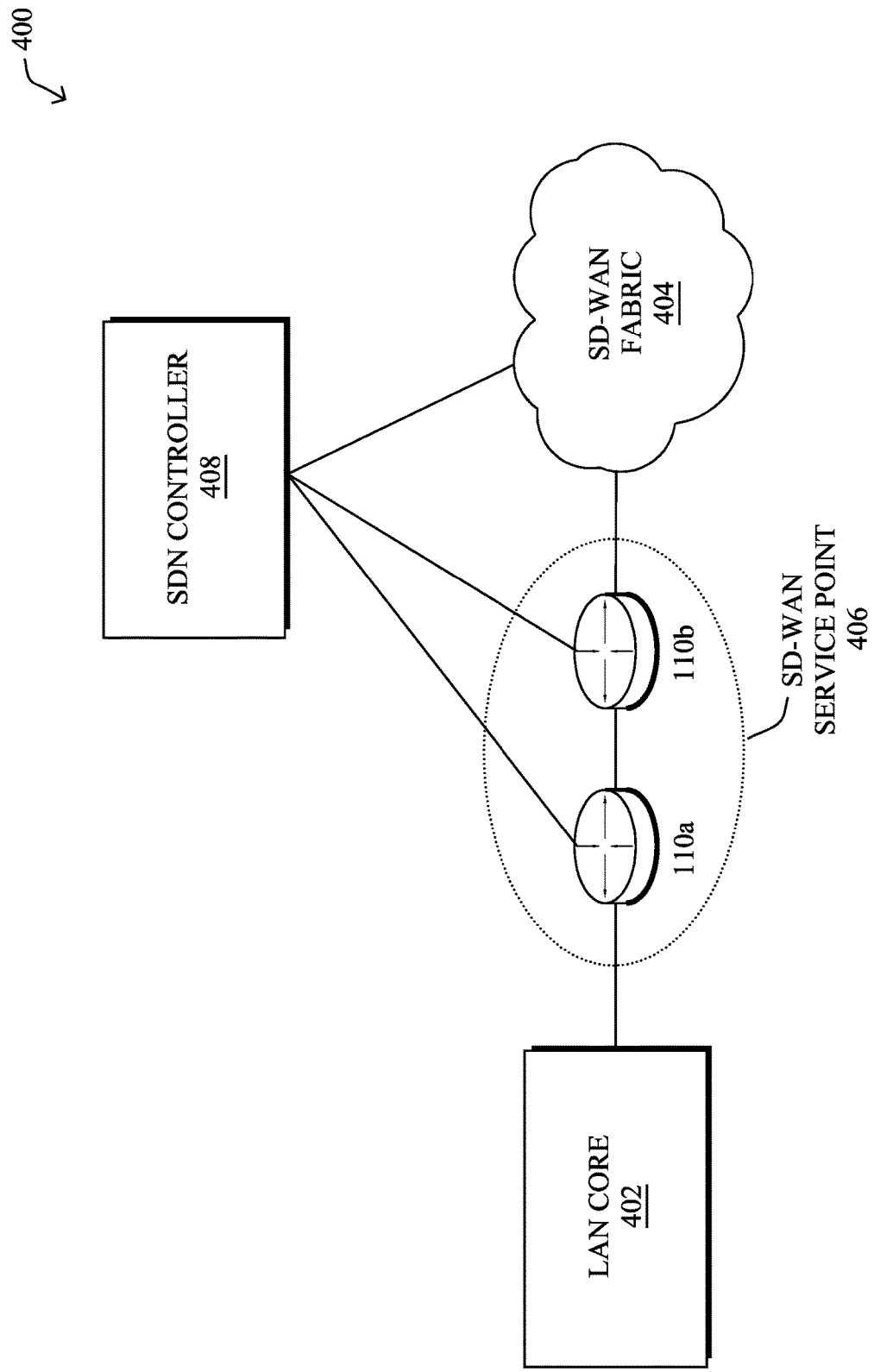
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted previously, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing s still entirely reactive: decisions are made using probes that reflect the status of a path at a given time, in contrast with the notion of an informed decision.

SLA failures are very common in the Internet and a good proportion of could be avoided (using an alternate path), if predicted in advance.

Figure 4B:
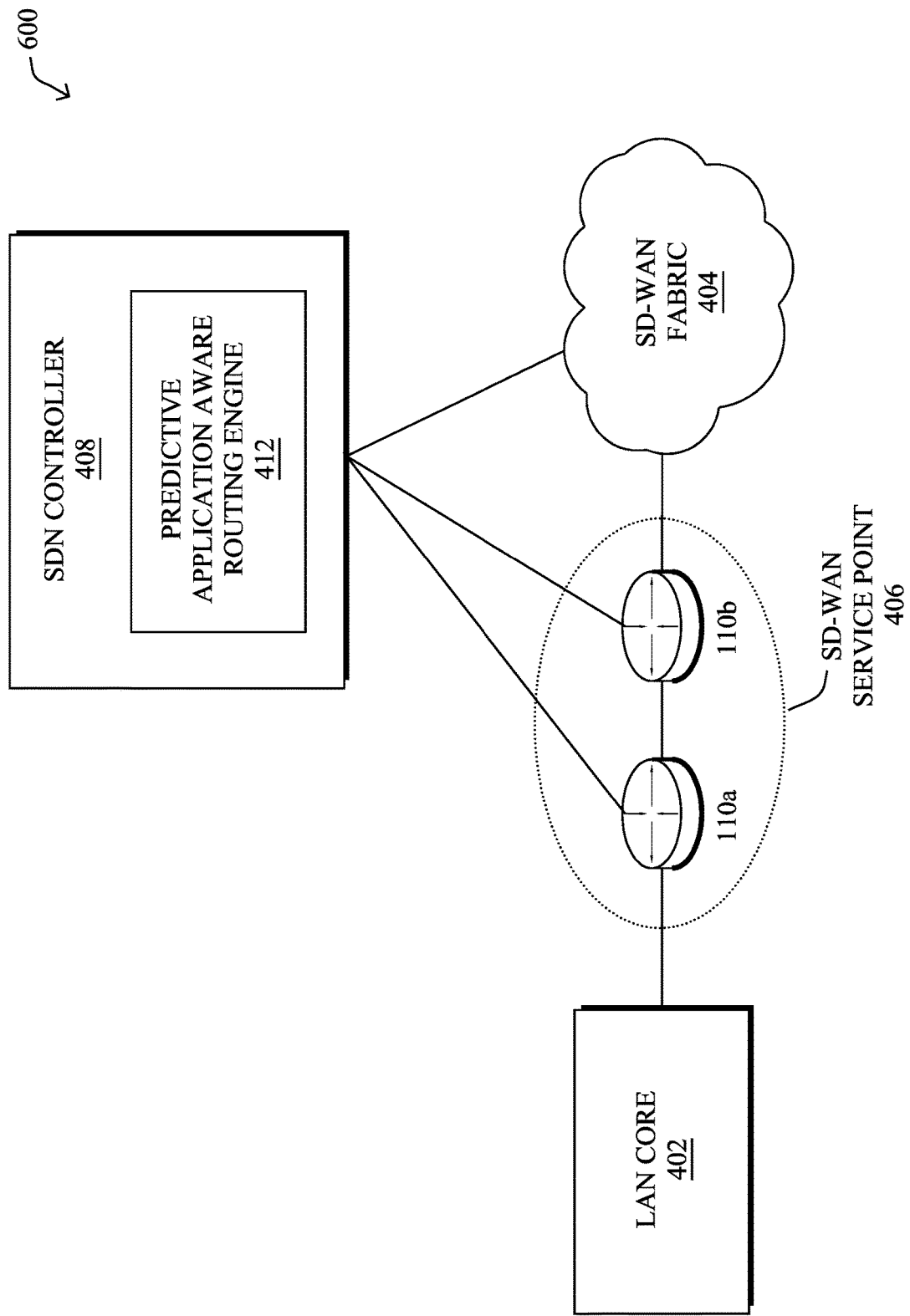

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or path evaluation process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, in SD-WANs, packets are routed on a secondary path if the existing path fails to meet the SLA of the traffic and provides inadequate QoS. For instance, one SLA for voice traffic may specify the following: latency≤150 ms, loss≤3%, and jitter≤30 ms. In such cases, packets are routed to a new path that is presumed to satisfy the SLA. However, this can also lead to the routing protocol causing the traffic to oscillate between multiple paths. This can happen, for instance, if the chosen new path after switchover turns out to provide inferior performance than other alternative paths or the original path is again eligible to carry the traffic its performance would again satisfy the SLA of the traffic).

More specifically, the traditional approach to ensuring that the network satisfies the SLA of traffic is to monitor the current path for SLA compliance and switch the traffic to a different path, if its SLA is not satisfied. Usually, verification timers are used in conjunction with a path switchover. For example, while the packets are conveyed via the new path, the performance of the new path may also be examined for a certain amount of time (e.g., one hour), to ensure that the new path is able to satisfy the SLA. If the new path is unable to satisfy the SLA, the traffic may be switched again.

Figure 5:
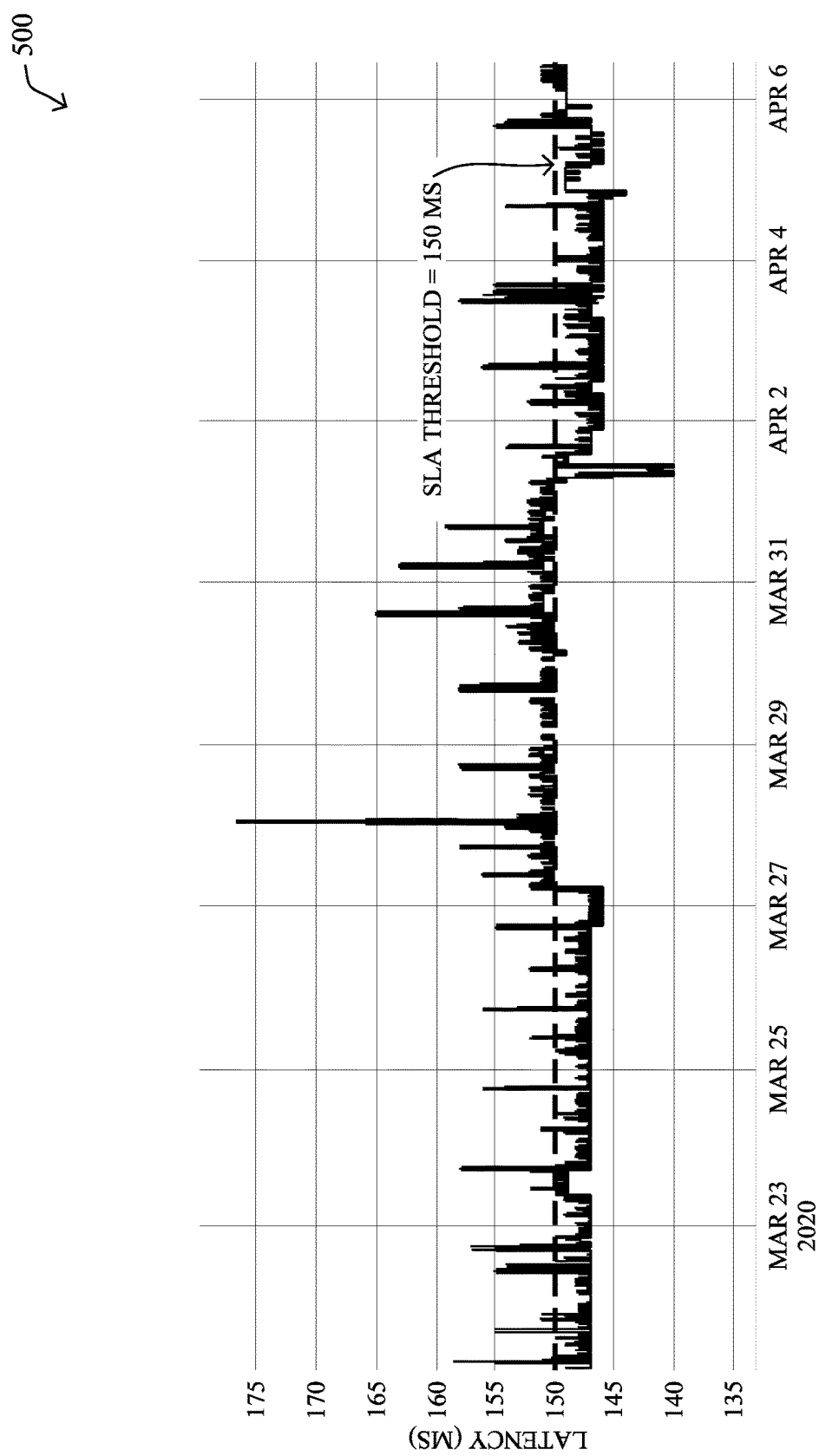
FIG. 5 illustrates an example plot of path latency over time.

FIG. 5 illustrates an example plot 500 of path latency for a tunnel (e.g., a path) over time, according to various embodiments. As shown, assume that the SLA for a particular type of traffic requires latency less than, or equal to, 150 ms. In such a case, the eligibility of the tunnel to carry the traffic may oscillate over time, as its latency fluctuates from acceptable to representing an SLA violation.

Strict timers used in purely reactive approaches can also lead to even more oscillations, especially when two paths exhibit performances that are 'close' to the SLA threshold(s). In such a case, the new path may be deduced to be unfit to carry the traffic after the traffic has already been rerouted. Moreover, approaches that use aggressive timers are more prone to oscillations since the path stability is examined for a very short amount of time.

—Adaptive Oscillation Control for Network Paths Using Machine Learning—

The techniques introduced herein allow a network to avoid oscillations by predicting the quality and stability of its paths using machine learning and/or statistics approaches. These techniques are particularly relevant in reactive networks whereby paths are (in)validated upon checking SLA validity via path probing. In some aspects, the techniques herein can also identify and propose modest changes to an SLA, to reduce oscillations (e.g., by increasing the latency threshold of the SLA for voice traffic from 150 ms to 160 ms, etc.).

Illustratively, the techniques described herein may be performed by hardware, software, and/or firmware, such as in accordance with the path evaluation process 248, which may include computer executable instructions executed by the processor 220 (or independent processor of interfaces 210) to perform functions relating to the techniques described herein (e.g., in conjunction with routing process 244).

Specifically, according to various embodiments, a device generates a model of oscillations between a particular path in a network satisfying a service level agreement template of traffic conveyed via the particular path and the particular path in the network not satisfying the service level agreement template. The device causes the traffic to be rerouted onto the particular path, based on a prediction by the model that the particular path will not oscillate for a period of time. The device determines, using the model, an adjustment to the service level agreement template that would reduce the oscillations. The device provides, to a user interface, an indication of the adjustment to the service level agreement template.

Figure 6:
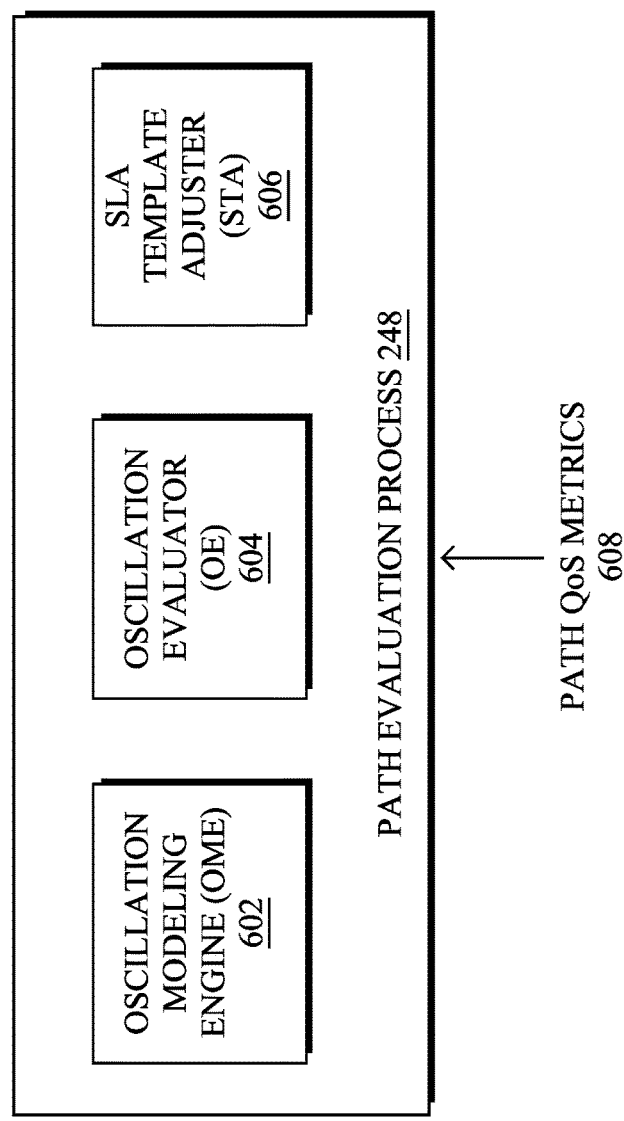
FIG. 6 illustrates an example architecture for adaptive oscillation control in a network.

Operationally, FIG. 6 illustrates an example architecture 600 for adaptive oscillation control, according to various embodiments. As shown, path evaluation process 248 may include any or all of the following components: an oscillation modeling engine (OME) 602, an oscillation evaluator (OE) 604, and/or an SLA template adjuster (STA) 606. As would be appreciated, the functionalities of these components may be combined or omitted, as desired. In addition, these components may be implemented on a singular device or in a distributed manner. For instance, these components may be executed by a particular router or other networking device, an SDN controller, or the like. Conversely, certain components of path evaluation process 248 may be executed on-box by a router or other networking device, while other components may be executed by a supervisory, such as an SDN controller. In the distributed case, the combination of executing devices can be viewed as their own singular device for purposes of executing path evaluation process 248.

During execution, path evaluation process 248 may receive path QoS metrics 608 measured for any number of paths (e.g., links, tunnels, etc.) in a network. For instance, QoS metrics 608 may include measurements such as at least one of: loss, latency, or jitter measured along a path. As would be appreciated, QoS metrics 608 can be measured in a variety of different ways. For example, such metrics may be measured through the sending of BFD probes, HTTP probes, or the like, along the path.

According to various embodiments, oscillation modeling engine (OME) 602 may be configured to predict the predicting the stability of a path with respect to oscillations, given the past QoS metrics 608 of that path. To do so, OME 602 may also consider other contextual input, such as traffic, time-of-the-day, or the like, to predict the stability of the path. In some embodiments, given an SLA violation constraint, OME 602 may then predict the stability of path by estimating the probability that SLA will be violated based on the prediction of loss, latency and jitter.

In a first embodiment. OME 602 may store statistics regarding any or all of QoS metrics 608 for a given path, such as by calculating their means and standard deviations, other statistical moment (e.g., variance, skewness, kurtosis, etc.), or the like, over a predefined amount of time (e.g., the past n-number of days). Using this information. OME 602 may predict whether the SLA will be violated if the (mean+k*standard deviation) of any of the QoS metric violates the SLA. Here, k can be chosen as 1, 2 or 3, to control how conservative OME 602 is in estimating an SLA violation.

Figure 7A:
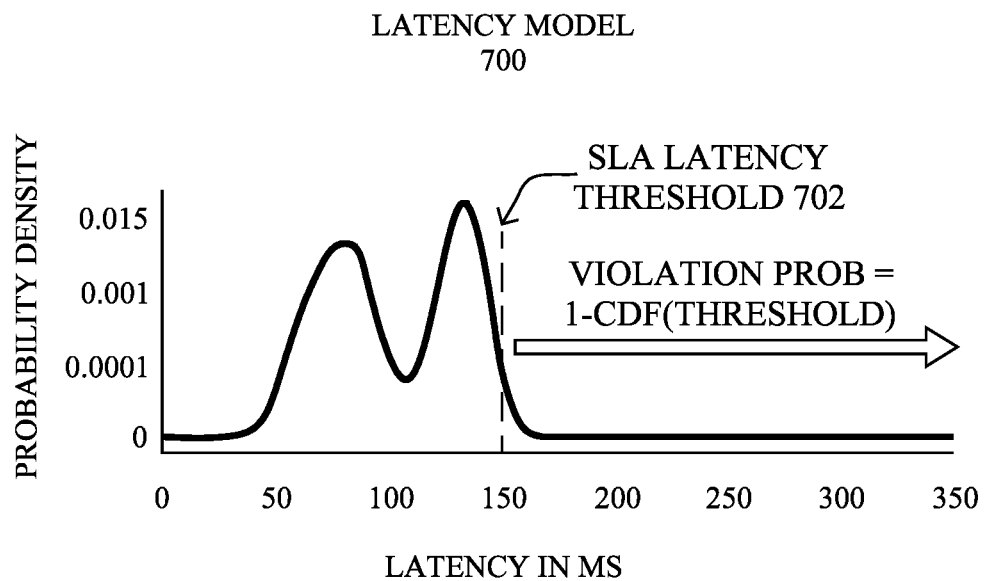
FIGS. 7A-7C illustrate example approaches to modeling path oscillations.
Figure 7B:
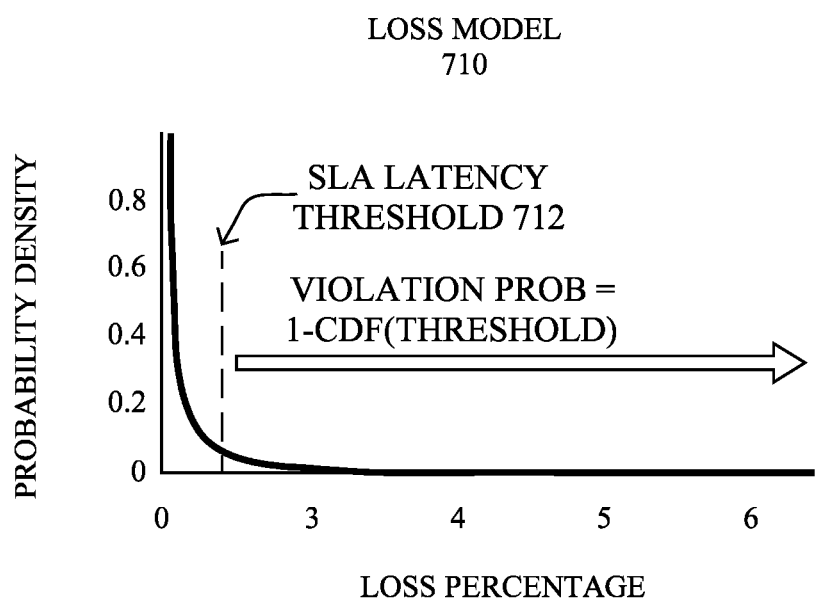

In other embodiments, OME 602 may statistically model different path QoS metrics 608, assuming different distributions, and predict SLA violations from the model. For example, FIG. 7A illustrates an example latency model 700 that can be implemented as a Gaussian Mixture Model with an SLA latency threshold 702. Similarly, FIG. 7B illustrates an example loss model 710 in which the loss percentage that can be modeled as a beta distribution with an SLA loss threshold 712. Using such models, OME 602 the stability of the path to fluctuate around the SLA violation threshold by computing the SLA violation probability of the QoS metric as 1−CDF(threshold), where CDF is the cumulative distribution function and 'threshold' is the corresponding SLA threshold. The overall stability of the path can then be computed as the path being unstable either because of its latency, loss, jitter, or combinations thereof.

Referring again to FIG. 6, OME 602 may model path QoS metrics 608 using time-series modeling, such as a univariate or multivariate model with other contextual features, in a further embodiment. Such an approach will result in a model that provides a time-varying band for each QoS metric.

Similar to above, OME 602 may predict whether an SLA will be violated at a future time t+n if the upper band of the predicted metric is greater than the SLA violation threshold for that metric. In further embodiments. OME 602 may predict QoS metrics using recursive neural networks.

Figure 7C:
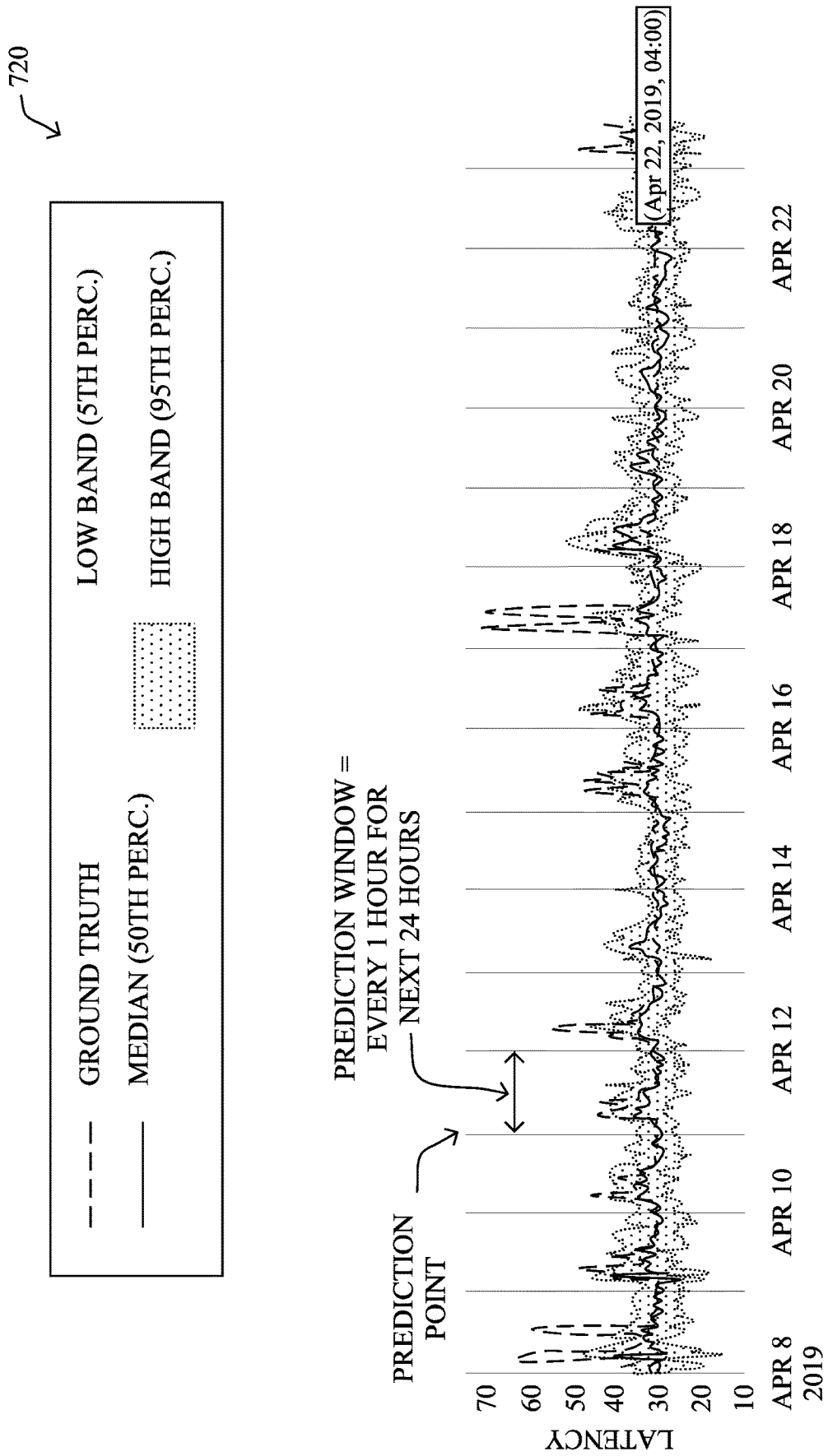

FIG. 7C illustrates an example 720 showing a time-series based approach to modeling latency and predicting the latency over the next twenty-four hours. The prediction includes the uncertainty band which denotes the possible upper and lower thresholds between which the latency may exist. In this particular case, an autoregressive neural network was used for the modeling. However, other time-series modeling approaches such as Prophet or Arima can be considered. Note also that exogenous variables (e.g., traffic, etc.) can also be included as input, to model QoS metrics. In the above case, the "stability" of the path for a given SLA template can be estimated by using the bands: the path is considered stable if the SLA violation threshold is ≥upper band or ≤lower band for all QoS metrics. Otherwise, the path is considered to be unstable.

Referring again to FIG. 6, OME 602 may train a machine learning-based classifier to classify a path $P_A$ as "stable" or "unstable" for a given set of SLA templates S. Here, the model may input different features before time 't' and predict the stability of the path at time 't+n':

QoS metrics, traffic and throughput at time t

Number of oscillations around the SLA violation for each QoS metric in the last x timeslots The statistics of the above features can be added by OME 602 as features for different time-granularities in the past x timeslots (e.g., mean and standard deviation of latency over last 10 mins, 30 mins, 1 day). In turn, the model of OME 602 may output whether the path is stable or not, as well as the probability of the path being 'stable.' These values can then be used to recommend a path switchover or the keep the traffic on its current path.

OME 602 may also retrain a QoS prediction model to account for changes in the path behavior over time, such as periodically or in response to a request to do so. In addition, OME 602 may monitor the effectiveness of any path switching decisions that result from its predictions. For instance, if a model predicts too many false positives (e.g., path switches that resulted in oscillations), OME 602 may decide to pause further path switchover recommendations by its model or initiate retraining of the model.

According to various embodiments, another potential component of path evaluation process 248 may be oscillation evaluator (OE) 604. During execution, OE 604 may be responsible for implementing any recommended path switchovers by OME 602. For instance, assume that OE 604 receives as input a recommended switchover from path $P_A$ to $P_B$ for an application $A_i$ having a given SLA template. In such a case, OE 604 may assess the following:

Whether the path $P_B$ will be stable for the SLA template for the next n-number of minutes Whether path $P_A$ is expected to continue to violate the SLA for the next n-number of minutes.

Based on its assessment, OE 604 may send a command for a suitable action to the network controller, if any, based on the expected oscillations.

In one embodiment, OE 604 may query OME 602 about the stability of QoS metrics and SLA violation for path $P_B$. A switch is recommended if $P_B$ are predicted to not violate SLA and QoS metrics are stably above SLA thresholds (as determined by OME) for the next n minutes. Note that OME 602 may utilize one or more models that provide QoS metrics and SLA violation prediction as described previously.

In another embodiment. OE 604 may consider the predicted states of both $P_A$ and $P_B$ before switching the traffic to path $P_B$. For example, OE 604 may recommend a switchover only if $P_B$ is stably above for the given SLA template and $P_A$ is predicted to violate the SLA over the next n-number of minutes.

In yet another embodiment, a user may configure one or more 'buffer' values for QoS metrics which needs to be respected. For example, the user may recommend that the predicted latency should be 20 ms less than the SLA violation thresholds and predicted loss should be 0.5% below the SLA violation threshold. In such a case. OE 604 may query OME 602 to provide predicted QoS metrics and will then apply the user-provided rules to decide whether the path should be switched or not.

OE 604 may also store a history of path switchover decisions, both in favor of switchovers and against. This allows OE 604 to compute statistics about the routing recommendations and cancelations and provide them to a user interface for review. This reporting may also indicate other information such as the paths in the network that are most prone to oscillations.

A further component of OE 604 may be SLA template adjuster (STA) 606, which is responsible for determining whether modest changes to SLA violation thresholds can drastically reduce the oscillations. To do so, STA 606 may monitor the input and the output of OE 604, to determine whether the SLA threshold can be slightly modified to avoid oscillations between some paths.

By way of example, consider the case where the latency of path $P_A$ is around the SLA latency threshold, and it constantly fluctuates few milliseconds [ms] above and below the threshold. Due to this fluctuation, there will be multiple requests to switch to or from path $P_A$, based on its current latency value. As would be appreciated, this may cause many oscillations.

In one embodiment, STA 606 may monitor the paths and the respective SLA templates that are frequently involved in oscillations, such as by fetching the QoS metrics for the path from OME 602. For example, OME 602 may indicate that path $P_A$ has a mean latency of 145 ms with standard deviation of 10 ms. Clearly, such a path is deemed to fluctuate around a voice SLA template with a set latency threshold of 150 ms. Accordingly, STA 606 may recommend an adjusted latency threshold value of 140 ms to an administrator. If the administrator accepts the recommendation, STA 606 may dynamically alter the SLA threshold in the SLA template. In another embodiment, STA 606 may implement the adjustment, automatically.

In another embodiment, STA 606 may customize the SLA threshold for each path. For example, in the above example, a latency threshold of 150 ms for voice traffic can be applied to all paths except for path $P_A$. For path $P_A$, STA 606 may reduce the latency threshold of the SLA template for the voice traffic to 140 ms. STA 606 may also promote a path-specific SLA policy to a generic SLA policy that applies for all paths, if it finds that a large proportion of the paths have the problem of fluctuation of QoS metric around the threshold, in a further embodiment.

Figure 8:
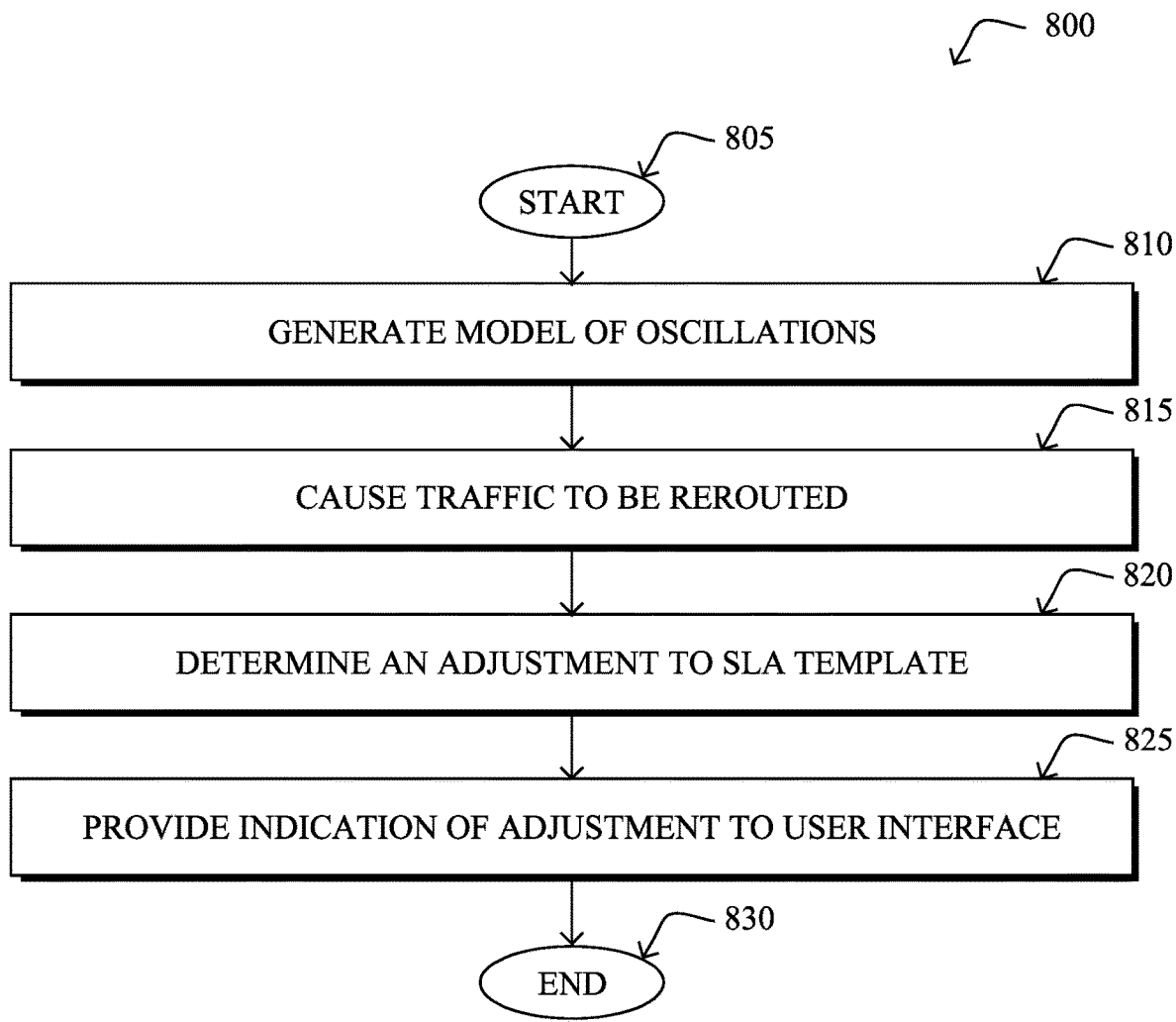
FIG. 8 illustrates an example simplified procedure for adaptive oscillation control for a network.

FIG. 8 illustrates an example simplified procedure for adaptive oscillation control for a network, in accordance with one or more embodiments described herein. For example, a non-generic, specifically configured device (e.g., device 200), such as a networking device (e.g., a router, an SDN controller for an SD-WAN, etc.), may perform procedure 800 by executing stored instructions (e.g., path evaluation process 248). The procedure 800 may start at step 805, and continues to step 810, where, as described in greater detail above, the device may generate a model of oscillations between a particular path in a network satisfying a service level agreement (SLA) template of traffic conveyed via the particular path and the particular path in the network not satisfying the SLA template. In various embodiments, the model may take the form of a recursive neural network, a time series model, a statistical model (e.g., based on a mean and standard deviation of each quality of service metric of the SLA template), or the like.

At step 815, as detailed above, the device may cause the traffic to be rerouted onto the particular path, based on a prediction by the model that the particular path will not oscillate for a period of time. For instance, the device may send an indication that the traffic should be rerouted onto the particular path to an SDN controller. Doing so may result in the traffic being routed, such as in the case in which the network comprises an SD-WAN and the particular path is a network tunnel. In further embodiments, the device may further base its decision to reroute the traffic on a prediction by a second model that a current path conveying the traffic will violate the SLA template. In other words, the device may take into account the predicted oscillations of both the current path and the particular path, when deciding whether to reroute the traffic.

At step 820, the device may determine, using the model, an adjustment to the SLA template that would reduce the oscillations, as described in greater detail above. For instance, if the particular path is predicted to violate one or more QoS metrics of the template by only a slight amount, the device may base the adjustment on this amount, so as to avoid the SLA template from being violated.

At step 825, as detailed above, the device may provide, to a user interface, an indication of the adjustment to the service level agreement template. In doing so, a network administrator may review the adjustment and issue a command to implement the adjustment, if the adjustment is acceptable. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce an adaptive oscillation control mechanism for network paths using machine learning. In some aspects, the techniques herein can be used to identify and help avoid situations in which a network path (e.g., a tunnel) oscillates between satisfying an SLA template and violating the SLA template. In further aspects, the techniques herein may also suggest changes to the SLA template that would reduce these oscillations.

While there have been shown and described illustrative embodiments that provide for adaptive oscillation control in a network, it is to be understood that various other adaptations and modifications may be made within the spirit and scope of the embodiments herein. For example, while certain embodiments are described herein with respect to using certain models for purposes of predicting tunnel failures, SLA violations, and oscillation conditions, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
generating, by a device, a model of oscillations between a particular path in a network satisfying a service level agreement template of traffic conveyed via the particular path and the particular path in the network not satisfying the service level agreement template;
causing, by the device, the traffic to be rerouted onto the particular path, based on a prediction by the model that the particular path will not oscillate for a period of time;
determining, by the device and using the model, an adjustment to the service level agreement template that would reduce the oscillations; and
providing, by the device and to a user interface, an indication of the adjustment to the service level agreement template.

2. The method as in claim 1, wherein the network comprises a software-defined wide area network (SD-WAN) and wherein the particular path comprises a network tunnel.

3. The method as in claim 1, further comprising:
receiving, via the user interface, a command to accept the adjustment to the service level agreement template; and
making the adjustment to the service level agreement template, after receiving the command.

4. The method as in claim 1, wherein generating the model of oscillations comprises:
calculating at least one of: a mean, standard deviation, or statistical moment of each quality of service metric of the service level agreement template over time; and
generating a statistical prediction model for each quality of service metric using its mean, standard deviation, or statistical moment.

5. The method as in claim 1, further comprising:
receiving, via the user interface, one or more buffer values for quality of service metrics of the service level agreement template, wherein the device causes the traffic to be rerouted onto the particular path based in part on the one or more buffer values.

6. The method as in claim 1, wherein causing the traffic to be rerouted onto the particular path comprises:
sending an indication that the traffic should be rerouted onto the particular path to a software defined network (SDN) controller for the network.

7. The method as in claim 1, wherein the model comprises a recursive neural network.

8. The method as in claim 1, wherein causing the traffic to be rerouted onto the particular path further comprises:
making, by the device and using a second model, a prediction that a current path conveying the traffic in the network will violate the service level agreement template, wherein the device causes the traffic to be rerouted onto the particular path based further in part on this prediction.

9. The method as in claim 1, wherein the model comprises a time series model.

10. The method as in claim 1, wherein the service level agreement template specifies a threshold for at least one of: loss, latency, or jitter.

11. An apparatus, comprising:
one or more network interfaces;
a processor coupled to the one or more network interfaces and configured to execute one or more processes; and
a memory configured to store a process that is executable by the processor, the process when executed configured to:
generate a model of oscillations between a particular path in a network satisfying a service level agreement template of traffic conveyed via the particular path and the particular path in the network not satisfying the service level agreement template;
cause the traffic to be rerouted onto the particular path, based on a prediction by the model that the particular path will not oscillate for a period of time;
determine, using the model, an adjustment to the service level agreement template that would reduce the oscillations; and
provide, to a user interface, an indication of the adjustment to the service level agreement template.

12. The apparatus as in claim 11, wherein the network comprises a software-defined wide area network (SD-WAN) and wherein the particular path comprises a network tunnel.

13. The apparatus as in claim 11, wherein the process when executed is further configured to:
receiving, via the user interface, a command to accept the adjustment to the service level agreement template; and
making the adjustment to the service level agreement template, after receiving the command.

14. The apparatus as in claim 11, wherein the apparatus generates the model of oscillations by:
calculating at least one of: a mean, standard deviation, or statistical moment of each quality of service metric of the service level agreement template over time; and
generating a statistical prediction model for each quality of service metric using its mean, standard deviation, or statistical moment.

15. The apparatus as in claim 11, wherein the process when executed is further configured to:
receive, via the user interface, one or more buffer values for quality of service metrics of the service level agreement template, wherein the apparatus causes the traffic to be rerouted onto the particular path based in part on the one or more buffer values.

16. The apparatus as in claim 11, wherein the apparatus causes the traffic to be rerouted onto the particular path by:
sending an indication that the traffic should be rerouted onto the particular path to a software defined network (SDN) controller for the network.

17. The apparatus as in claim 11, wherein the model comprises a recursive neural network.

18. The apparatus as in claim 11, wherein the apparatus causes the traffic to be rerouted onto the particular path further by:
making, using a second model, a prediction that a current path conveying the traffic in the network will violate the service level agreement template, wherein the apparatus causes the traffic to be rerouted onto the particular path based further in part on this prediction.

19. The apparatus as in claim 11, wherein the model comprises a time series model.

20. A tangible, non-transitory, computer-readable medium storing program instructions that cause a device to execute a process comprising:

generating, by the device, a model of oscillations between a particular path in a network satisfying a service level agreement template of traffic conveyed via the particular path and the particular path in the network not satisfying the service level agreement template;

causing, by the device, the traffic to be rerouted onto the particular path, based on a prediction by the model that the particular path will not oscillate for a period of time;

determining, by the device and using the model, an adjustment to the service level agreement template that would reduce the oscillations; and providing, by the device and to a user interface, an indication of the adjustment to the service level agreement template.

\* \* \* \* \*

UNITED STATES PATENT AND TRADEMARK OFFICE
CERTIFICATE OF CORRECTION

| | | |
|---|---|---|
| PATENT NO. | : 11,108,651 B1 | Page 1 of 1 |
| APPLICATION NO. | : 17/082215 | |
| DATED | : August 31, 2021 | |
| INVENTOR(S) | : Grégory Mermoud | |

It is certified that error appears in the above-identified patent and that said Letters Patent is hereby corrected as shown below:

In the Specification

Column 9, Line 16, please amend as shown:
Routing is still entirely reactive: decisions are made using Column 9, Line 20, please amend as shown:
proportion of them could be avoided (e.g., using an alternate Column 10, Line 6, please amend as shown:
to carry the traffic (e.g., its performance would again satisfy the Column 11, Line 37, please amend as shown:
In a first embodiment, OME 602 may store statistics Column 11, Line 42, please amend as shown:
past n - number of days). Using this information, OME 602

Column 12, Line 4, please amend as shown:
for that metric. In further embodiments, OME 602 may Column 13, Line 4, please amend as shown:
In another embodiment, OE 604 may consider the pre- Column 13, Line 15, please amend as shown:
below the SLA violation threshold. In such a case, OE 604

Signed and Sealed this
Seventeenth Day of September, 2024

Katherine Kelly Vidal
*Director of the United States Patent and Trademark Office*